US00RE37902E

(19) United States

(12) Reissued Patent

Gill et al.

(10) Patent Number: US RE37,902 E

(45) Date of Reissued Patent: Nov. 5, 2002

(54) BROMINATED POLYSTYRENE HAVING IMPROVED THERMAL STABILITY AND COLOR AND PROCESS FOR THE PREPARATION THEREOF

(75) Inventors: James C. Gill, Macedonia, OH (US); James L. Dever, Medina, OH (US)

(73) Assignee: Albemarle Corporation, Richmond, VA (US)

(21) Appl. No.: 09/356,734

(22) Filed: Jul. 19, 1999

Related U.S. Patent Documents

Reissue of:

(64) Patent No.: 5,726,252
Issued: Mar. 10, 1998
Appl. No.: 08/796,277
Filed: Feb. 7, 1997

U.S. Applications:
(

(62) Division of application No. 08/661,350, filed on Jun. 14, 1996, now Pat. No. 5,637,650.

(51) Int. Cl.[7] ..... C08F 8/22

(52) U.S. Cl. ..... 525/333.5; 525/333.4; 525/356; 525/357; 525/359.1; 525/359.3

(58) Field of Search ..... 525/333.4, 333.3

(56) References Cited

U.S. PATENT DOCUMENTS

| | | | | |
|---|---|---|---|---|
| 1,890,772 | A | 12/1932 | Dykstra | 260/93.5 |
| 2,199,026 | A | 4/1940 | Levine et al. | 260/74 |
| 2,823,201 | A | 2/1958 | Wheaton | 260/93.5 |
| 3,009,906 | A | 11/1961 | Eichhorn et al. | 260/93.5 |
| 3,039,977 | A | 6/1962 | Ingram | 260/2.5 |
| 3,050,476 | A | 8/1962 | Tress et al. | 260/2.5 |
| 3,132,045 | A | 5/1964 | Hill | 117/138 |
| 3,474,067 | A | 10/1969 | Praetzel et al. | 260/41 |
| 3,506,741 | A | 4/1970 | Trepka et al. | 260/889 |
| 3,534,012 | A | 10/1970 | Dennis | 260/91.5 |
| 3,932,542 | A | 1/1976 | Gerns | 260/650 R |
| 3,959,398 | A | 5/1976 | Jalics | 260/650 R |
| 3,975,354 | A | 8/1976 | Buxbaum et al. | 260/40 R |
| 4,028,486 | A | 6/1977 | Jalics | 526/293 |
| 4,074,032 | A | 2/1978 | Naarmann et al. | 526/44 |
| 4,107,231 | A | 8/1978 | Wurmb et al. | 260/873 |
| 4,137,212 | A | 1/1979 | Theysohn et al. | 260/37 N |
| 4,143,221 | A | 3/1979 | Naarmann et al. | 526/44 |
| 4,151,223 | A | 4/1979 | Neuberg et al. | 260/873 |
| 4,178,327 | A | 12/1979 | Hall et al. | 525/169 |
| 4,200,703 | A | 4/1980 | Diebel et al. | 525/357 |
| 4,352,909 | A | 10/1982 | Barda et al. | 525/157 |
| 4,360,455 | A | 11/1982 | Lindenschmidt et al. | 252/609 |
| 4,389,517 | A | 6/1983 | Priddy et al. | 526/64 |
| 4,394,484 | A | 7/1983 | Jenkner et al. | 525/72 |
| 4,501,859 | A | 2/1985 | Newman et al. | 525/356 |
| 4,513,116 | A | 4/1985 | Kowalski et al. | 525/53 |
| 4,548,995 | A | 10/1985 | Kowalski et al. | 525/354 |
| 4,554,326 | A | 11/1985 | Kowalski et al. | 525/354 |
| 4,636,554 | A | 1/1987 | Tada et al. | 525/359.3 |
| 4,650,832 | A | 3/1987 | Kowalski et al. | 525/354 |
| 4,748,286 | A | 5/1988 | Daren et al. | 570/200 |
| 4,832,873 | A | 5/1989 | Favstritsky et al. | 252/601 |
| 4,835,222 | A | 5/1989 | Sypniewski | 525/359.5 |
| 4,879,353 | A | 11/1989 | Sanders et al. | 525/357 |
| 4,975,496 | A | 12/1990 | Tigner et al. | 525/357 |
| 5,112,896 | A | 5/1992 | Dever et al. | 524/412 |
| 5,112,897 | A | 5/1992 | Dever et al. | 524/412 |
| 5,112,898 | A | 5/1992 | Dever et al. | 524/412 |
| 5,194,482 | A | 3/1993 | Chundury et al. | 524/412 |
| 5,235,000 | A | 8/1993 | McKinnie | 525/355 |
| 5,243,109 | A | 9/1993 | Kornberg et al. | 570/193 |
| 5,304,618 | A | 4/1994 | Atwell et al. | 526/293 |
| 5,326,837 | A | 7/1994 | Kissin | 526/150 |
| 5,328,983 | A | 7/1994 | Favstritsky et al. | 528/490 |
| 5,334,680 | A | 8/1994 | Mukai | 526/207 |
| 5,369,202 | A | 11/1994 | Atwell et al. | 526/293 |
| 5,532,322 | A | 7/1996 | Kadono et al. | 525/357 |
| 5,637,650 | A | 6/1997 | Gill et al. | 525/356 |
| 5,677,390 | A | 10/1997 | Dadgar et al. | 525/355 |
| 5,686,538 | A | 11/1997 | Balhoff et al. | 525/355 |
| 5,723,549 | A | 3/1998 | Dever et al. | 525/333 |
| 5,726,252 | A | 3/1998 | Gill et al. | 525/333.3 |
| 5,733,823 | A | 3/1998 | Sugioka et al. | 442/110 |
| 5,767,203 | A | 6/1998 | Ao et al. | 525/355 |
| 5,852,131 | A | 12/1998 | Balhoff et al. | 525/355 |
| 5,852,132 | A | 12/1998 | Dadgar et al. | 525/355 |
| 5,916,978 | A | 6/1999 | Ao et al. | 525/355 |

FOREIGN PATENT DOCUMENTS

| | | |
|---|---|---|
| EP | 0 020 294 | 12/1980 |
| EP | 0 047 549 A2 | 3/1982 |
| EP | 0 139 931 | 8/1985 |
| EP | 0201411 | 12/1986 |
| EP | 0 277 429 | 8/1988 |
| EP | 0 394 645 | 10/1990 |
| EP | 0 709 398 A1 | 1/1996 |

(List continued on next page.)

OTHER PUBLICATIONS

George A. Olah, Shiro Kobayashi, and Masashi Tashiro Freidal–Crafts Benzylation of Benzene and Toluene with Benzyl and Substituted Benzyl.

(List continued on next page.)

*Primary Examiner*—Bernard Lipman
(74) *Attorney, Agent, or Firm*—Edgar E. Spielman, Jr.

(57) ABSTRACT

In a process for the suppression of backbone halogenation during the bromination of polystyrenes comprising the step of pretreating a solution of a polystyrene reactant comprising from about five to about 20 percent by weight of a polystyrene reactant, in a halogenated hydrocarbon solvent with at least about 0.1 percent by weight of an additive to suppress halogenation of the polystyrene backbone prior to brominating the polystyrene in the presence of a catalyst; adding a metal halide bromination catalyst to the solution, capable of effecting bromination of the ring without causing crosslinking of the polystyrene; adding to the solution from about 1 to about 3.4 moles of a brominating agent, per mole of polystyrene repeating units; reacting the polystyrene reactant with the brominating agent at a reaction temperature of from about −20° C. to about 50° C., and isolating the brominated polystyrene. A brominated polystyrene is also provided having a backbone halogen content of less than about 750 ppm and, a ΔE color as low as about 5.

6 Claims, No Drawings

FOREIGN PATENT DOCUMENTS

| | | |
|---|---|---|
| EP | 0 763 567 | 3/1997 |
| FR | 2 370 758 | 6/1978 |
| FR | 2 413 409 | 7/1979 |
| GB | 1589700 | 5/1981 |
| JP | 61034723 | 8/1986 |
| JP | 63-150349 | 6/1988 |
| JP | 2215807 | 8/1990 |
| JP | 6-322022 | 11/1994 |
| JP | 7-2930 | 1/1995 |
| JP | 8-53511 | 2/1996 |
| JP | 10-130325 | 5/1998 |
| JP | 3020708 B2 | 3/2000 |
| WO | WO 91/13915 | 9/1991 |
| WO | WO 9503341 | 2/1995 |
| WO | WO 98 50439 | 11/1998 |

OTHER PUBLICATIONS

Halides, Journal of the American Chemical Society, vol. 94, pp. 7448–7461 (1972).

Wenger, Richard M., "Glass Reinforced Flame Retardant Nylon–Improved Performance For Connector Applications," dated approximately 1984, 19 pages.

Brochure from Ferro Corporation, Fire Retardant Chemical Association, Fall 1992 Conference, "Brominated Polystyrene Flame Retardant Additives," pp. 141–150.

McCabe et al., "Unit Operations of Chemical Engineering," McGraw–Hill Book Company, Third Edition, pp. 619–627.

Derwent Abstract of JP 8053511.

Patent Abstracts of Japan (European Patent Office)—Abstract of JP 051 70809, publication date of Jul. 1993 to Tosoh Corporation.

Brochure from Ferro Corporation, Production Information, Pyro–Chek 68PB & Pyro–Chek 60PB, Brominated Polystyrene Flame Retardant Additives, 4 pages, 1992.

JP 8176414 (Jul. 9, 1996)—Abstract No. 223551, XP002128364, Chemical Abstracts, Columbus, Ohio, vol. 125, No. 18, Oct. 28, 1996.

JP 8283550 (Oct. 29, 1996)—Abstract Class A13, AN 1997–017575, XP002128367, Database WPI Section Ch, Week 199702, Derwent Publications Ltd., London, GB.

JP 5287014 (Nov. 2, 1993)—Abstract No. 246108, XP002128365, Chemical Abstracts, Columbus Ohio, vol. 120, No. 20, May 16, 1994.

JP 2255755 (Oct. 16, 1998)—Abstract No. 1869970, XP002128366, Chemical Abstracts, Columbus, Ohio, vol. 114, No. 20, May 20, 1991.

BROMINATED POLYSTYRENE HAVING IMPROVED THERMAL STABILITY AND COLOR AND PROCESS FOR THE PREPARATION THEREOF

Matter enclosed in heavy brackets [ ] appears in the original patent but forms no part of this reissue specification; matter printed in italics indicates the additions made by reissue.

This application is a division of application Ser. No. 08/661,350, filed Jun. 14, 1996 now U.S. Pat. No. 5,637,650.

TECHNICAL FIELD

Brominated polystyrene is used as an additive to thermoplastics to impart flame retardant properties. In addition to thermal stability, it is necessary and desirable for these additives to impart essentially no color to the thermoplastic. The evolution of engineering thermoplastics has resulted in specialty polymers with much higher heat resistance and, as a result, a need to process these new materials at ever increasing temperatures. Because of higher and higher processing temperatures, the flame retardant additives used in these engineering thermoplastics must have a higher order of thermal stability and better color than that required in the past. Accordingly, this invention generally relates to a brominated polystyrene having improved color and thermal stability. More particularly, the invention relates to a process for the bromination of polystyrene which overcomes the limitations of current technology by use of an additive to suppress backbone halogenation.

BACKGROUND OF THE INVENTION

Reports of the use of brominated polystyrene as a flame retardant additive in thermoplastics extend back more than twenty-five years. In 1980, Ferro Corporation, the Assignee of record herein, introduced brominated polystyrene as a commercial flame retardant additive under the trade name PyroChek® 68PB. The process for producing PyroChek® 68PB is described in U.S. Pat. No. 4,352,909. This product has become a leading flame retardant additive for use in reinforced engineering thermoplastics. More recently, Great Lakes Chemical has introduced a second brominated polystyrene product, PDBS-80, to the marketplace. This product also finds its primary application in engineering thermoplastics.

Thus, there are currently two different synthetic routes available for the commercial production of brominated polystyrenes. Each process has certain advantages and disadvantages which should be noted in order to fully understand the significance of the present invention.

The process used to produce PDBS-80, the commercial product offered by Great Lakes Chemical, is described in U.S. Pat. No. 5,369,202. It involves four chemical steps starting from styrene monomer. The first step involves the addition of HBr across the double bond of the styrene in order to protect it. In the second step, this intermediate is brominated on the ring using conventional technology. Usually an average of two bromines are introduced. The second intermediate is then reacted with strong inorganic base. This eliminates hydrogen bromine from the bromoethyl group of the second intermediate, reforming the double bond to produce brominated styrene monomer. After purification, this monomer is polymerized to form the brominated polystyrene product. The entire process may be represented as follows:

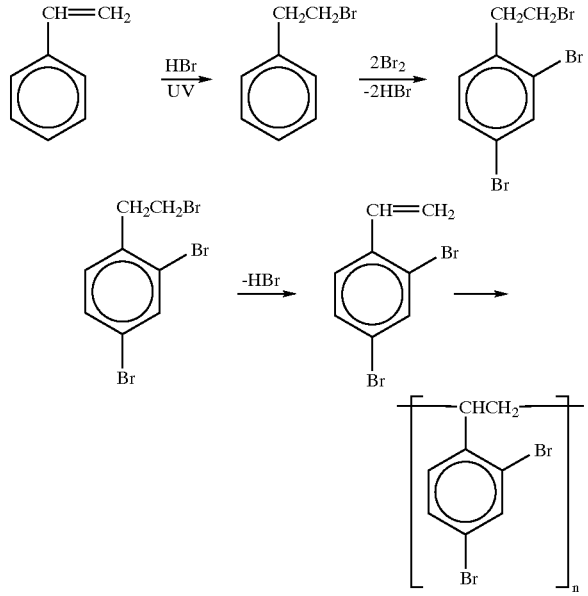

This process has one significant advantage. It produces a brominated polystyrene which is essentially free of backbone halogen. This results in a product with very good thermal stability, good color, and good color stability. However, the process has two serious limitations which are major disadvantages when compared to the alternate process.

a. The process involves four distinct chemical reactions as well as several other unit operations. It is a complex process requiring a complex manufacturing facility with a high capital cost and the multiplicity of steps results in a long process. This process is inherently expensive.

b. Brominated styrene monomers are very reactive and difficult to handle. Ideally, a brominated aromatic flame retardant additive should have a high bromine content in order to have maximum efficiency and minimum cost. Thus, it would be preferable to produce and polymerize tribromostyrene monomer. However, this monomer is a highly reactive solid with low volatility. It is difficult to handle and polymerize and any residual monomer in the polymer would be difficult to remove. Consequently, this process tends to be limited to dibromostyrene as the maximum degree of bromination practical by this process. This limits the bromine content of the commercial brominated polystyrene (PDBS-80) to about 60%. Consequently, when used as a flame retardant additive, a relatively high use level is required to achieve flame retardance. This makes the product expensive to use. But of even greater concern to the user is the fact that high use levels cause deterioration of the important physical properties of the host resin. This result is frequently unacceptable to the user.

The process used by Ferro Corporation to produce its brominated polystyrene flame retardant additive. PyroChek® 68PB is described in the aforementioned U.S. Pat. No. 4,352,909. This process has many advantages over the process which involves the production and polymerization of brominated styrene monomer. Some of these include:

a. The process involves only a single chemical reaction, the bromination of commercially available polystyrene dissolved in a commercially available solvent using a commercially available brominating agent, bromine chloride. The process can be carried out in a simpler plant with a much lower capital cost. This process is inherently less expensive than the production of brominated polystyrene by the preparation and polymerization of brominated styrene monomer.

b. Because the process never involves the formation and handling of brominated styrene monomer, it does not have the limitations of the other process. It is possible to achieve tribromination and approach bromine contents of 70%. Since the brominating agent is less expensive than the polystyrene raw material, this actually reduces the cost of the product. Further, higher bromine contents result in lower use levels to achieve flame retardance. This reduces costs. But of even greater importance, reduced use levels result in better retention of physical properties of the host resin.

c. The process allows the use of a wide variety of polystyrenes and this, in turn, allows for the production of a variety of brominated polystyrenes. Further, general purpose, crystal polystyrene is produced in very large volumes in every part of the developed and developing world. This makes it readily available and inexpensive.

Notwithstanding the many advantages this process has over the process for making brominated polystyrene from monomer, a disadvantage exists which is beginning to limit the value and versatility of this product. In particular, while the process puts most of the bromine on the aromatic ring of the polystyrene, it also puts a small but significant amount of bromine and chlorine on the backbone. Typically, the amount of halogen, reported as HBr, on the backbone is 5000–6000 ppm, as measured by a test procedure described in detail hereinbelow. This backbone halogen is the direct cause of the limited thermal stability of brominated polystyrenes produced in this manner and is the direct cause of both its problems regarding initial color and color stability during thermal processing. Under the conditions of thermal processing, the backbone halogen of the current brominated polystyrenes produced in this manner may be released causing corrosion of processing equipment and degradation of the host resin. The formation of unsaturation in the backbone of the brominated polystyrene also leads to a loss of good color during processing. Since the technology trend in engineering thermoplastics is to higher and higher processing temperatures, the current brominated polystyrenes produced in this manner are becoming less acceptable in newer applications.

When brominated polystyrene is employed as a flame retardant additive in thermoplastics, its color is a property of primary importance to the manufacturer of the thermoplastic materials. The thermoplastic manufacturer desires to produce the thermoplastic articles in a wide range of colors. The more highly colored an additive, the more difficult it becomes to match (produce) a broad range of colors. The more lightly colored the additive, the easier it becomes to produce a wide range of colors. Therefore, in view of the needs of the manufacturer of thermoplastic parts, and in view of the inadequacy of prior art processes to produce a highly brominated polystyrene having the desired light color characteristics, a need exists for a highly brominated polystyrene with an improved light appearance as manufactured so that the end user can formulate a wide range of colors and thereby better meet the needs and demands of the marketplace.

SUMMARY OF INVENTION

It is therefore, an object of the present invention to provide a process for highly brominating polystyrenes which allows the direct bromination of polystyrene to produce a product with excellent thermal stability, excellent color, good color stability, and a minimum of backbone halogen.

It is another object of the present invention to provide a process which can be carried out in the existing facilities for the bromination of polystyrene without modification, without any additional capital investment, and with an absolute minimum of increase in raw material cost.

It is yet another object of the present invention to provide a process which utilizes an additive for the suppression of backbone halogenation, thereby allowing the operator to obtain highly brominated polystyrenes having improved thermal stability and color.

It is another object of the present invention to provide a highly brominated polystyrene having improved color and thermal stability and with less backbone halogen.

At least one or more of the foregoing objectives, together with the advantages thereof over existing prior art forms, which shall become apparent from the specification which follows, are accomplished by the invention as hereinafter described and claimed.

In general, a process for the suppression of backbone halogenation during the bromination of polystyrenes comprises pretreating a solution of a polystyrene reactant comprising from about five to about 20 percent by weight of a polystyrene reactant, in a halogenated hydrocarbon solvent with at least about 0.1 percent by weight of an additive to suppress halogenation of the polystyrene backbone, prior to brominating the polystyrene in the presence of a catalyst; gradually adding a metal halide bromination catalyst to the solution, capable of effecting bromination of the ring without causing crosslinking of the polystyrene; adding to the solution from about 1 to 3.4 moles of a brominating agent, per mole of polystyrene reactant repeating units; reacting the polystyrene reactant with the brominating agent at a reaction temperature of from about −20° C. to about 50° C., and isolating the brominated polystyrene.

The present invention also provides a brominated polystyrene having a backbone halogen content of less than about 750 ppm and, a ΔE color as low as about 5.

PREFERRED EMBODIMENT FOR CARRYING OUT THE INVENTION

Brominated polystyrene, marketed primarily as Pyro-Chek® 68PB by Ferro Corporation, the Assignee of record herein, has been a leading flame retardant additive for engineering thermoplastics for many years. As currently produced, it can contain anywhere between 3000 to 6000 ppm and typically contains 5000 to 6000 ppm of backbone halogen, measured as HBr. This latter factor is the primary source of the poor thermal stability of the additive which, in turn, is a problem at higher processing temperatures. Furthermore, it has a [color ΔE] *ΔE color* of 30, measured as a solution in chlorobenzene and compared to the color of pure chlorobenzene. Total Color Difference (ΔE) is determined using the Hunter L, a, b scales, for product solutions in chlorobenzene.

One preferred embodiment of the process of the present invention may be represented by the following equation, involving two steps:

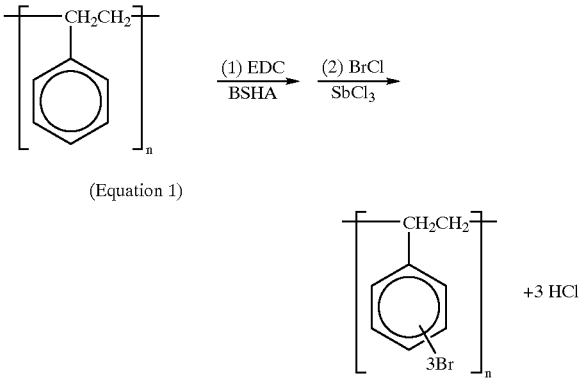

(Equation 1)

In Equation I, the term BHSA refers to backbone halogenation suppressing additive which will be explained later. As Equation I indicates, the reaction in this embodiment of the invention is generally conducted in a solvent, preferably a chlorinated hydrocarbon solvent. In step (1) the BHSA, solvent and polystyrene are combined. Preferred solvents include halogenated hydrocarbons such as carbon tetrachloride, chloroform, methylene chloride, 1,2-dichloroethane, 1,2-dibromoethane, 1,1,2-trichloroethane, 1,1,2,2-tetrachloroethane and the like. The preferred solvent is EDC (1,2-dichloroethane). Mixtures of solvents can also be employed.

The polystyrene reactant that is employed may be either an oligomer or a polymer. Accordingly, the initial molecular weight of the polystyrene is from about 500 $\overline{M}w$ to about 1,500,000 $\overline{M}w$ and preferably from about 500 $\overline{M}w$ to about 500,000 $\overline{M}w$. The process is also effective for the bromination of substituted polystyrene, the substitution being nuclear. Obviously, nuclear substituents will affect the position(s) at which the bromination occurs and the amount of additional bromination that takes place. Examples of the substituted polystyrenes that may be brominated in accordance with the process of the invention include halogenated and alkylated polymers such as poly-(bromo-styrene), poly-(chlorostyrene), poly-(dichlorostyrene), poly-(dibromostyrene), poly-(chloro-bromo-styrene), poly-(4-methyl styrene) and poly-(mono-lower alkyl styrene). Halogen substituents include chlorine and bromine and alkyl substituents include lower alkyl group having from one to about four carbon atoms. Accordingly, the term polystyrene reactant, or just polystyrene, as used throughout the specification and claims, shall refer to the foregoing homopolystyrene and oligomers as well as substituted polystyrenes within the scope of this invention.

The reaction is carried out to introduce up to three bromine atoms on each aromatic nucleus. Hydrogen chloride or hydrogen bromide is produced as a byproduct of the reaction, depending upon whether bromine chloride or bromine is used.

While the invention can be employed, as indicated in Equation I above, for the production of what is essentially tribrominated polystyrene, the process of the invention is of general utility for the production of brominated polystyrene products having any desired degree of bromination up to three.

Prior art bromination techniques, applied to styrene polymers or oligomers, are currently less effective than the present process in producing a suitably light colored material. Products can be produced by the preferred process of the invention at any desired level of bromination with very good color characteristics, i.e., very light in color, so that the highly brominated products are desirable flame retardant additives for the plastics industry. Products having a lower degree of bromination than essentially tribromination are also useful as flame retardant additives.

U.S. Pat. No. 4,352,909 provides an adequate description of the current commercial process for brominating polystyrene and accordingly, the subject matter of this patent is incorporated herein by reference. Briefly summarized, that process involves dissolving the polystyrene to be brominated in a suitable solvent (usually ethylene dichloride) which is reasonably dry (less than 150 ppm of $H_2O$). A catalyst is added, usually antimony trichloride, and then the brominating agent, usually bromine chloride, is added gradually while controlling the temperature, usually between 20° and 40° C. When the reaction is complete, the excess brominating agent is decomposed by the addition of a reducing agent, usually aqueous sodium bisulfite. The aqueous phase is separated and the organic phase is washed with water several times to remove residual acid. While the product can be isolated using any one of several methods, the normal procedure involves gradual addition of the solution of product in ethylene dichloride to very hot water. This causes the solvent to flash distill off, leaving the product as a slurry in water. The product is then dewatered by centrifugation and finally dried by flash and/or rotary vacuum drying.

The present invention requires only one minor but extremely important change in the above procedure. After the polystyrene is dissolved in the solvent and before addition of the bromination catalyst and brominating agent, an additive to suppress halogenation of the polystyrene backbone, or backbone halogenation suppressing additive (BHSA) is dissolved in the solution and the mixture is stirred for up to an hour. After this step (1) is completed, the remainder of the process is carried out in the usual manner, involving the addition of brominating agent and catalyst, step (2).

While the effect on backbone halogenation suppression occurs merely upon addition of the BHSA, optimum benefit occurs after some period of agitation once the BHSA has been added and prior to addition of the bromination catalyst and the brominating agent. In other words, zero addition time works, which is defined as adding the BHSA first and immediately proceeding to add the catalyst and brominating agent. However, in most instances it is preferable to pretreat the polystyrene in solution in the presence of the BHSA. Pretreatment can last for as few as 15 minutes, up to several hours. As a practical matter, while extended periods of pretreatment are not deleterious, after one to several hours it is considered desirable to proceed with the remaining steps of the process rather than tie up the reaction vessel and equipment unnecessarily. During the step of pretreating, the solution with BHSA can be agitated in a conventional manner. The addition of BHSA and pretreating step may be conducted at temperatures ranging between about −20° and 50° C. and at standard pressure.

With respect to catalyst selection, bromination is via Friedel-Crafts catalysis and thus, metal halides are employed. The catalyst must satisfy two criterion, first, it must be capable of carrying out the bromination and second, it must do so without causing concurrent cross-linking of the polystyrene via Freidel-Crafts alkylation. Recognizing that the system contains aliphatic halogens either from the polystyrene backbone or the solvent, or both, the catalyst selected should not effect reaction between the two causing crosslinking. Those skilled in the art can readily determine suitable catalysts as it is well known first, which of the known metal halides can catalyze the reaction and second, those that will not effect the undesired crosslinking. The literature is replete with such references, a suitable list being available in Journal of the American Chemical Society, Vol. 94, pp 7448–7461, George A. Olah, Shiro Kobayashi and Masashi Tashiro (1972).

Returning to the process of the present invention, while this process change, involving the use of a BHSA, can be viewed as minimal and having little economic impact, the effect on the quality of the product is quite profound. The amount of backbone halogenation is reduced as much as 95% and the color is improved by as much as 50%. Further, the color stability during thermal processing is greatly improved. The product has all of its original advantages without the disadvantage of high backbone halogen which results in poor color and/or thermal stability.

Reduction of backbone halogen content can be achieved with the addition of as little as 0.1% by weight (based on polystyrene charge) of the backbone halogenation suppressing additive (BHSA). Relatively large amounts of BHSA, on the order of 15 to 20%, can be added without significant negative consequence. However, addition beyond the optimum level does not result in further reduction of backbone halogen content. The best balance of performance and cost is typically achieved when the BHSA level is between one and five percent, by weight of the polystyrene charge.

Our co-pending application, [Ser. No. 08/663,657] *now U.S. Pat. No. 5,723,549*, filed contemporaneously herewith, describes several normal reaction parameters which, if properly controlled, can enhance the color of brominated polystyrene. These include reaction time and temperature, choice of catalyst and brominating agent, and the method of isolation. The effect of these variables is also observed when BHSA is employed to reduce backbone halogenation. However, several things should be kept in mind. First, the variables described in [Ser. No. 08/663,657 ] *U.S. Pat. No. 5,723,549* do not provide any positive control over backbone halogenation. Second, the impact of these variables on color is diminished when BHSA is employed. For example, conducting the bromination at lower temperatures will improve product color when BHSA is employed. However, the improvement is not as great as without the use of the BHSA. When BHSA is employed almost all the color improvement is due to suppression of backbone halogenation. It should be noted that the use of a BHSA not greatly reduces backbone halogenation but its use also results in a much more forgiving process. This has great practical value in the commercial operation of a production facility. Unexpectedly, by the addition of the backbone halogenation suppressing additive (BHSA) to the solution of the polystyrene reactant in the chlorinated hydrocarbon solvent, the backbone halogen, measured as HBr, is reduced by as much as an order of magnitude over conventional processes for preparing brominated polystyrenes. As an example, backbone halogen can be lowered from about 3000 to 6000 ppm to about 750 ppm, and preferably at least about 250 ppm, for a reduction of as much as about 80 to 95%. Moreover, color is improved when the additive is employed such that a ΔE color of less than from about 6.7 to about 7.8 and as low as 5 is obtainable in comparison to a conventional ΔE color of between 13 and 16, a reduction of between about 30 to 60%. Thermal stability of the brominated polystyrene prepared according to the process of the present invention is also improved due to the lowered backbone halogen content.

Thermal stability of brominated polystyrene is improved for polystyrene products that are essentially or predominantly ring halogenated versus ring and backbone halogenated. Accordingly, when brominating polystyrene, the ideal result is to place 100% of the halogen on the aromatic ring of the polystyrene and to have no halogen on the backbone of the polymer. By way of explanation, bonds between benzylic (backbone) carbon atoms and halogen atoms are less thermodynamically stable than bonds between aromatic ring carbons and halogen atoms. For example, the bond dissociation energy of a C(benzylic)-Br bond is 51 kcal/mole while that of a C(aromatic)-Br bond is 71 kcal/mole. This means that a C(benzylic) Br bond will breakdown at a lower temperature than the C(aromatic)-Br bond. When this occurs, the very corrosive hydrogen bromide is released and a double bond is formed. As the number of double bonds in the backbone increases, the color quality of the brominated polystyrene will diminish. Hence backbone halogenation is to be avoided.

There is a graphic demonstration of the stability of ring bromine vs backbone bromine. It is possible, on a laboratory scale, to produce poly (tribromostyrene) from tribromostyrene monomer. Brominated polystyrene made in this way contains no backbone halogen. It contains 70.3% bromine, all of which is on the ring. On the other hand, brominated polystyrene made commercially via the process of U.S. Pat. No. 4,352,909 contains backbone halogen. There is a thermal stability test procedure detailed hereinbelow which involves heating the brominated polystyrene for 15 minutes at 300° C. and measuring the total amount of hydrogen bromide liberated during the test period. When this is done on the commercial brominated polystyrene, 3000–6000 ppm of HBr are liberated. When the same test is carried out on poly (tribromostyrene) made from monomer no HBr was detected. This shows that aromatic bromines are 100% stable at 300° C. while backbone halogen is sufficiently unstable to be eliminated well below 300° C.

The benefits of the process of the present invention are a result of the use of titanium tetrachloride as the additive. Other additives that could be employed include tin tetrachloride and boron trichloride, which are exemplified hereinbelow.

GENERAL EXPERIMENTAL

All of the data generated and reported herein to define practice of this invention has been conducted on a laboratory scale. In order to make a fair comparison, the properties obtained using the process of the present invention have been compared to those of commercial brominated polystyrene when it is produced on a laboratory scale. Under these conditions, PyroChek® 68PB has a color ΔE of 13 to 16 and a backbone halogen of 3000 to 6000 ppm, with 5000 to 6000 ppm being typical, measured as HBr, evolved while heating a measured sample for 15 minutes at 300° C.

The invention will now be further described in detail by descriptions of specific demonstrations thereof. In the following examples and throughout this application, all parts and percentages are by weight and all temperatures are expressed in degrees Celsius, unless expressly stated to be otherwise. All reactions were conducted at standard pressure.

Thermal Stability Test

Engineering thermoplastics (ETP's) have enjoyed tremendous growth during the past twenty-five years. One reason for this is that this class of materials, particularly the reinforced grades, have excellent heat resistance which makes them particularly useful for continuous use at elevated temperatures. In recent years, the development of new engineering thermoplastics has focused on materials with [every] *ever* increasing heat resistance. This has been accomplished by creating new polymers with higher glass transition temperatures (Tg) or higher melting points (Tm). However, the development of these new materials has not been without complications. As the Tg or Tm increased substantially, the temperatures required to process these materials also underwent substantial increases. Fifteen years ago, ETP's were rarely processed at melt temperatures approaching 300° C. Today, that processing temperature is quite common and new materials may now go as high as 350° C. when being processed.

In order to be useful, all the additives used to formulate the newer ETP's must have sufficient thermal stability to survive the higher processing temperatures. This is especially true of the halogen containing additives used to impart flame retardance to EPT's. If these additives have inadequate thermal stability, they will degrade when processed at high temperatures and liberate hydrogen chloride and/or hydrogen bromide which are very corrosive. If these materials are released during processing they may degrade the ETP or, at the very least, cause corrosion of the equipment used to process the thermoplastic. If this latter process occurred, it could cause serious damage to the equipment. This, in turn, would result in major expenses to repair the equipment and a loss of production time on the equipment. Obviously, a user of halogenated flame retardant additives would be greatly concerned about the thermal stability of the additives that they use.

As a supplier of halogenated flame retardant additives, Ferro Corporation felt that is was very important to develop a simple screening test which would allow for the evaluation of the relative thermal stability of various halogenated flame retardants. Conceptually, the procedure is very simple. A carefully measured sample (2.00±0.01 g) of additive is exposed to a temperature of 300° C. for fifteen minutes. All of the acidic gases (HCl, HBr) generated during the period are collected in a standard solution of NaOH. This solution is acidified to a pH<7 and then is titrated with standardized silver nitrate using a potentiometric tetrameter. This measures the parts per million of HCl and HBr that were released during the heating period. In the interest of simplicity, the ppm of HCl are converted into ppm HBr, this is added to the amount of HBr already measured, and the resultant number is reported as ppm of HBr equivalent. The larger the amount of HBr equivalent reported, the less thermally stable is the given additive. An additive releasing 0 ppm of HBr equivalent would have the best thermal stability. A detailed description of the test procedure follows.

Thermal Stability Test Procedure

The apparatus is assembled in a fume hood. A 2.00±0.01 g sample is weighed in a 20×150 mm tared test tube. Three 250 mL sidearm filter flasks are filled with 150–170mL of 0.1N NaOH (enough to completely cover the frit) containing phenolphthalein (2% w/v solution in 3A EtOH), and are connected with Viton® tubing. This allows the acidic gases generated by a sample in the test tube to be passed through the aqueous NaOH, thus trapping the HBr and/or HCl (HX). The test tube containing the sample is filled with a no. 2 neoprene stopper with a 1/16Δinlet and a 7 mm outlet for Teflon® tubing. The sample is purged with [$N_{2g}$)] $N_{2(g)}$ (flow rate=0.5 SCFH) for five minutes, then placed in the salt bath deep enough to surround the entire sample for 15 minutes. The sample is withdrawn from the bath and purged for another five minutes. The test tube containing the pyrolysed sample is removed and replaced with a clean empty test tube. This test tube with the [$N_{2g}$ ] $N_{2(g)}$ purge is submerged in the salt bath for five minutes to flush out any residual HX.

After the test tube is rinsed, the gas dispersion tubes are carefully removed and rinsed with deionized (di) $H_2O$, keeping $N_{2(g)}$ flow through the test tube during the rinse. Begin with the last collection flask and work back to the first. After all dispersion tubes are out, the empty test tube is removed. The Viton® tubing connecting each of the flasks is also rinsed with di $H_2O$. The contents of the flasks are combined and quantitatively transferred to bottles, rinsing with di $H_2O$, until the operator is ready to do titrations (described below). The solutions can be stored in these bottles with caps if the solution is kept alkaline. Two or three lest tubes containing no sample are run as blanks before the first sample each day of testing in order to verify that there is no residual HX in the system.

Once the samples have been pyrolysed and the HX gases collected, the bottled solutions are titrated in the analytical lab using a Metrohm 670 titroprocessor with an Ag combination electrode. Each sample solution is acidified with a 1:2 solution of $HNO_3$; [Dl] *di* $H_2O$, to a pH <7, and then [filtrated] *titrated* with standardized $AgNO_3$ to a potentiometric equivalence point. The parameters for the [filtration] *titration* are those which are recommended in the manual for the titroprocessor. Variations of those parameters are left to the discretion of the operator. The results are reported in duplicate as ppm HBr HCl, and ppm HBr Equivalents.

Calculations ppm HBr=(Ep 1 mL * $N_{titrant}$ * molecular wt, HBr * 1,000,000)/(wt. of Sample * 1000)11 ppm HCl=[(Ep2 mL–Ep1 mL) * $N_{titrant}$ * molecular wt. HCl * 1,000,000]/ (wt. Sample * 1000)

ppm HBr Eq={[Ep2 mL–Ep1 mL) * $N_{titrant}$ * molecular wt. of HBr * 1,000,000]/ (wt. Sample * 1000)}+ppm HBr where Ep=end point volume in mL and $N_{titrant}$=Normality of $AgNO_3$

Experimental Procedure

PyroChek® PB68 was produced in the laboratory by dissolving general purpose polystyrene in ethylene dichloride (EDC). Antimony trichloride (5% by weight based on polystyrene charged) was added as a catalyst. Then the brominating agent, bromine chloride, containing 10% EDC, was added gradually while maintaining the reaction temperature at 20° C. The total reaction time was five hours to produce the product described hereinabove.

In the present invention, the process is identical to the general process above, with one important exception and that is, prior to the addition of the catalyst and the initiation of bromination, the backbone halogenation suppression additive was added to the solution of EDC and polystyrene and the solution was agitated for 30 minutes. Thereafter, the general process was followed.

In the first series of experiments the level of BHSA employed was varied to determine the effect on product quality. All experiments were carried out at 20° C. with a 5 hour reaction time. The solvent was ethylene dichloride. The bromination catalyst was $SbCl_3$ used at a level of 0.023 moles per mole of polystyrene. The polystyrene solution containing the BHSA was agitated for 30 minutes before adding the bromination catalyst and initiating BrCl addition. Example No. 1 was a Control, Made according to U.S. Pat. No. 4,352,909, without any BHSA. Color was determined as Total Color Difference (ΔE), using the Hunter L, a, b scales, for product solution in chlorobenzene, 10 percent by weight concentration versus chlorobenzene, according to the formula:

$$\Delta E = \sqrt{(\Delta L)^2 + (\Delta a_L)^2 + (\Delta b_L)^2}$$

Results are reported in Table I.

TABLE I

EFFECT OF BHSA LEVEL ON PRODUCT QUALITY

| Ex. No. | BHSA Level(1) (Moles/Mole PS) | Color (ΔE)(2) | HBr Equivalent (ppm)(3) |
|---|---|---|---|
| 1 | 0 | 14.5 | 6000 |
| 2 | 0.0055 | 9.6 | 912 |
| 3 | 0.027 | 6.8 | 531 |
| 4 | 0.055 | 7.3 | 673 |
| 5 | 0.082 | 8.5 | 568 |

(1)BHSA is $TiCl_4$ in all experiments.
(2)Color was measured as a 10% solution in chlorobenzene. The ΔE was determined by comparison with the color of pure chlorobenzene.
(3)Amount released in 15 minutes at 300° C.

It will be noted that backbone halogenation was decreased as the amount of BHSA was increased and, that the content of backbone halogen was decreased by an order of magnitude over the Control. Color was also improved over the Control by the use of a BHSA.

In the next series of experiments, the level of BHSA employed was constant and the effect of agitation time was varied to determine the effect on product quality. Example No. 1 was the Control from Table I, without any BHSA. All experiments were carried out at 20° C. with a 5 hour reaction time. The bromination catalyst was $SbCl_3$ used at a level of 0.023 moles/mole of polystyrene. The solvent was ethylene dichloride.

TABLE II

EFFECT OF AGITATION TIME

| Ex. No. | BHSA Level(1) (Moles/ Mole PS) | Agitation Time(2) (Minutes) | Color(3) (ΔE) | HBr Equivalent(4) (ppm) | |
|---|---|---|---|---|---|
| 1 | None | 0 | 14.5 | 6000 | |
| 6 | 0.082 | 0 | 15.2 | 1002 | |
| 7 | 0.082 | 30 | 8.5 | [ 658] | *568* |

(1)BHSA is $TiCl_4$ in all experiments.
(2)Time between addition of BHSA and addition of bromination catalyst and initialation of BrCl addition.
(3)Color was measured as a 10% solution in chlorobenzene. The ΔE was determined by comparison with pure chlorobenzene.
(4)Amount released in 15 minutes at 300° C.

The use of a BHSA without prior agitation greatly reduced the level of backbone halogenation. However, the best results were obtained where the solution of polystyrene and BHSA was stirred together for at least 30 minutes.

In the next series of experiments, the brominating agent bromine was employed. Example No. 8 was another Control from Table I, without any BHSA. All experiments were carried out at 20° C. with a 5 hour reaction time. The bromination catalyst was $SbCl_3$ used at a level of 0.023 moles/mole of polystyrene. In the experiment with the BHSA, the solution of polystyrene and BHSA was agitated for 30 minutes before initiation of bromination. The solvent was ethylene dichloride.

TABLE III

WITH BROMINE AS THE BROMINATING AGENT

| Ex. No. | BHSA Level (Moles/Mole PS)1 | Color (ΔE)2 | HBr Equivalent (ppm)3 |
|---|---|---|---|
| 8 | 0 | 21.2 | 5939 |
| 9 | 0.082 | 10.5 | 750 |

1BHSA is $TiCl_4$
2Color was measured as a 10% solution in chlorobenzene. The ΔE was determined by comparison with pure chlorobenzene.
3Amount released in 15 minutes at 300° C.

As evident from the foregoing results, the use of a BHSA is effective when bromine is used as the brominating agent.

In the next series of experiments, the effect of different solvents was considered, using the same amount of BHSA. Example No. 1 was the Control from Table I, without any BHSA. All experiments were carried out at 20° C. with a 5 hour reaction time. The bromination catalyst was $SbCl_3$ used at a level of 0.023 moles/mole of polystyrene. The polystyrene solution containing the BHSA was agitated for thirty minutes before adding the bromination catalyst and initiating BrCl addition.

TABLE IV

EFFECT OF SOLVENT

| Ex. No. | BHSA Level1 (Moles/Mole PS) | Solvent | Color (ΔE)2 | HBr Equivalent (ppm)3 |
|---|---|---|---|---|
| 10 | 0.082 | $ClCH_2CH_2Cl$ | 8.6 | 602 |
| 11 | 0.082 | $ClCH_2CH_2Cl$ | 8.5 | 568 |
| 12 | 0.082 | $CH_2Cl_2$ | 11.7 | 624 |
| 13 | 0.082 | $CH_2Cl_2$ | 11.5 | 658 |
| 1 | None | $ClCH_2CH_2Cl$ | 14.5 | 6000 |

1BHSA is $TiCl_4$ in all experiments.
2Color was measured as a 10% solution in chlorobenzenz. The ΔE was determined by comparison with the color of pure chlorobenzene.
3Amount released in 15 minutes at 300° C.

In the next series of experiments, two other materials were employed as the BHSA and compared against titanium tetrachloride and the Control, Example No. 1 from Table I, without any BHSA. All experiments were carried out at 20° C. with a 5 hour reaction time. The bromination catalyst in each experiment was $SbCl_3$ at a use level of 0.023 moles per mole of polystyrene. The level of BHSA was 0.082 moles per mole of polystyrene. The solvent was ethylene dichloride. The polystyrene solution containing the BHSA was stirred for 0.5 hours before adding the bromination catalyst and initiating the addition of BrCl.

TABLE V

REPRESENTATIVE ADDITIVES PROVIDING SUPPRESSION OF BACKBONE HALOGENATION

| Ex. No. | BHSA | Color (ΔE)1 | HBr Equivalent (PPM)2 |
|---|---|---|---|
| 1 | None | 14.5 | 6000 |
| 14 | $TiCl_4$ | 8.5 | 568 |
| 15 | $SnCl_4$ | 9.7 | 262 |
| 16 | $BCl_3$ | 13.7 | 267 |

1Color was measured as a 10% solution in chlorobenzene. The ΔE was determined by comparison with the color of pure chlorobenzene.
2Amount released in 15 minutes at 300° C.

It will be noted that backbone halogenation was decreased and color was also improved over the Control by the use of all three BHSA materials. Again, the content of backbone halogenation was decreased by an order of magnitude over the Control when a BHSA was employed.

In view of the foregoing results, the brominated polystyrene of the present invention provides a bromine content of at least about 66 percent by weight; backbone halogen, conventionally between 3000 to 6000 ppm, is reduced by as much as 95% and preferably 80 to 95% to less than about 750 ppm and preferably 250 ppm, and, a ΔE color conventionally between 13 and 16, is reduced by as much as 60% and preferably 40 to 60% to less than about 7 and as low as about 5. Thermal stability of the brominated polystyrene is assured and is increased because the backbone halogenation is so much lowered compared to conventional brominated polystyrenes.

Thus it should be evident that the process of the present invention is highly effective in preparing a brominated polystyrene having improved thermal stability and color.

Based upon the foregoing disclosure, it should now be apparent that the use of the process described herein will achieve the objectives set forth hereinabove. It is, therefore, to be understood that any variations evident fall within the scope of the claimed invention and thus, the selection of specific component elements can be determined without departing from the spirit of the invention herein disclosed and described. In particular, the brominating agent, catalysts and reaction temperatures and times and other reaction conditions according to the present invention are not necessarily limited to those discussed herein. Nor, is practice of the present invention necessarily limited to the use of titanium tetrachloride, tin tetrachloride or boron trichloride as the additive to suppress backbone halogenation during the bromination of polystyrenes. Thus, the scope of the invention shall include all modifications and variations that may fall within the scope of the attached claims.

What is claimed is:

[1. A brominated polystyrene product made by the process comprising:

pretreating a solution of a polystyrene reactant comprising from about five to about 20 percent by weight of said polystyrene reactant, in a halogenated hydrocarbon solvent with at least about 0.1 percent by weight of an additive to suppress halogenation of the polystyrene backbone, prior to brominating the polystyrene in the presence of a catalyst;

subsequently adding a metal halide bromination catalyst to said solution, capable of effecting bromination of the ring without causing crosslinking of the polystyrene;

adding to said solution from about 1 to about 3.4 moles of a brominating agent, per mole of polystyrene repeating units;

reacting said polystyrene with said brominating agent at a temperature of from about −20° C. to about 50° C., and isolating the brominated polystyrene.]

[2. A brominated polystyrene having a backbone halogen content of less than about 750 ppm and, a ΔE color as low as about 5.]

[3. A brominated polystyrene, as in claim 2, having a bromine content of at least about 66 percent by weight.]

[4. A brominated polystyrene, as in claim 2, wherein said brominated polystyrene reactant is produced from a polystyrene having a weight average molecular weight of from about 500 to about 1,500,000.]

[5. A brominated polystyrene, as in claim 4, wherein said polystyrene reactant is selected from the group consisting of homopolystyrene, polystyrene oligomers, halogenated polystyrenes and alkylated polystyrene.]

[6. A brominated polystyrene process as in claim 2, wherein said a backbone halogen content is 580 ppm.]

[7. A brominated polystyrene process as in claim 2, wherein said ΔE color is 8.5.]

[8. A flame retardant additive comprising the brominated polystyrene, as in claim 2.]

*9. A brominated polystyrene flame retardant which is a derivative of polystyrene and which has a bromine content of at least about 66 wt % and a ΔE color of less than about 7.8 to as low as 5.*

*10. The brominated polystyrene flame retardant of claim 9 wherein the ΔE color is less than about 6.8 to as low as about 5.*

*11. The brominated polystyrene flame retardant of claim 9 wherein the ΔE color is less than about 7 to as low as about 5.*

*12. A brominated polystyrene flame retardant which is a derivative of polystyrene and which has a bromine content of at least about 66 wt %, a ΔE color of less than about 7.8 to as low as 5 and a backbone halogen content from about 250 to about 750 ppm.*

*13. The brominated polystyrene flame retardant of claim 12 wherein the ΔE color is less than about 6.8 to as low as about 5.*

*14. The brominated polystyrene flame retardant of claim 12 wherein the ΔE color is less than about 7 to as low as about 5.*

* * * * *

UNITED STATES PATENT AND TRADEMARK OFFICE

CERTIFICATE OF CORRECTION

PATENT NO. : RE 37,902 E
DATED : November 5, 2002
INVENTOR(S) : James C. Gill et al.

It is certified that error appears in the above-identified patent and that said Letters Patent is hereby corrected as shown below:

Title page,
Item [56], References Cited, U.S. PATENT DOCUMENTS, "4,200,703 A 4/1980 Diebel et al...525/357" should read -- 4,200,703 A 4/1980 et al...525/340 --.
FOREIGN PATENT DOCUMENTS, reads "63-153049" should read -- Sho 63-150349 --; reads "6-322022" should read -- Hei 6-322022 --; reads "7-2930" should read -- Hei 7-2930 --; reads "8-53511" should read -- Hei 8-53511 --; and reads "10-130325" should read -- Hei 10-130325 --
After Item [57], reads "6 Claims, No Drawings" should read -- 14 Claims, No Drawings --

Column 7,
Line 49, reads "facitity. Unexpectedly," should read -- faclity. (new paragraph) Unexpectedly, --

Column 14,
Line 19, reads "polystyrene" should read -- polystyrenes --

Signed and Sealed this

Twelfth Day of April, 2005

JON W. DUDAS
*Director of the United States Patent and Trademark Office*

UNITED STATES PATENT AND TRADEMARK OFFICE

CERTIFICATE OF CORRECTION

PATENT NO. : RE 37,902 E
DATED : November 5, 2002
INVENTOR(S) : James C. Gill et al.

It is certified that error appears in the above-identified patent and that said Letters Patent is hereby corrected as shown below:

Column 14,
Line 29, reads "...as low as 5..." should read -- ...as low as about 5. --
Line 39, reads "...as low as 5..." should read -- ...as low as about 5... --

Signed and Sealed this

Twenty-sixth Day of July, 2005

JON W. DUDAS
*Director of the United States Patent and Trademark Office*